United States Patent [19]
Luker

[11] Patent Number: 5,893,388
[45] Date of Patent: Apr. 13, 1999

[54] WATERFLOW MONITORING DEVICE

[76] Inventor: John Luker, P.O. Box 774, Buffalo, Tex. 75831

[21] Appl. No.: 09/010,760

[22] Filed: Jan. 22, 1998

[51] Int. Cl.$^6$ .............................. F16K 17/20; F16K 21/16
[52] U.S. Cl. ........................................ 137/456; 137/487.5
[58] Field of Search .................... 137/486, 487.5, 137/460, 456, 624.12, 624.13, 624.15; 73/861

[56] References Cited

U.S. PATENT DOCUMENTS

| | | | |
|---|---|---|---|
| 2,860,511 | 11/1958 | Wickesser | 73/861 |
| 4,481,562 | 11/1984 | Hickson | 362/183 |
| 4,589,435 | 5/1986 | Aldrich | 137/456 X |
| 4,807,661 | 2/1989 | Lewis et al. | 137/456 |
| 4,911,200 | 3/1990 | Ben-Arie | 137/624.12 X |
| 5,086,806 | 2/1992 | Engler et al. | 137/624.12 X |
| 5,287,884 | 2/1994 | Cohen | 137/624.12 X |
| 5,409,037 | 4/1995 | Wheeler et al. | 137/624.12 X |
| 5,638,847 | 6/1997 | Hoch, Jr. et al. | 137/460 X |
| 5,771,920 | 6/1998 | Jewett et al. | 137/456 |
| 5,782,263 | 6/1998 | Issacson, Jr. et al. | 137/487.5 |

*Primary Examiner*—Stephen M. Hepperle
*Assistant Examiner*—John Bastianelli

[57] ABSTRACT

A water leak detection valve system is provided including a water inlet pipe for receiving an unlimited amount of water. Also included is a water outlet pipe for supplying various water appliances within a building with water. A water valve is connected between the water inlet pipe and the water outlet pipe. The water valve is adapted to preclude the flow of water therebetween upon being closed. Next provided is a water flow monitor device connected between the water inlet pipe and the water outlet pipe. The water flow monitor device serves to monitor the current flow rate of water through the water pipes and further begin a timer upon the beginning of water flow after each cessation of such water flow, wherein the timer continues to track time only as long as water flow continues. The water flow monitor device is further adapted to close the water valve upon certain criteria being met.

2 Claims, 2 Drawing Sheets

5,893,388

WATERFLOW MONITORING DEVICE

BACKGROUND OF THE INVENTION

1. Field of the Invention

The present invention relates to water cut off valves and more particularly pertains to a new water flow monitoring device for precluding the flow of water within a building upon the detection of the water amounting to a predetermined amount.

2. Description of the Prior Art

The use of water cut off valves is known in the prior art. More specifically, water cut off valves heretofore devised and utilized are known to consist basically of familiar, expected and obvious structural configurations, notwithstanding the myriad of designs encompassed by the crowded prior art which have been developed for the fulfillment of countless objectives and requirements.

Known prior art water cut off valves include U. S. Pat. No. 5,409,037; U.S. Pat. No. 5,287,884; U.S. Pat. Des. 277,286; U.S. Pat. No. 5,086,806; U.S. Pat. No. 4,481,562; and U.S. Pat. No. 4,659,063.

In these respects, the water flow monitoring device according to the present invention substantially departs from the conventional concepts and designs of the prior art, and in so doing provides an apparatus primarily developed for the purpose of precluding the flow of water within a building upon the detection of the water amounting to a predetermined amount.

SUMMARY OF THE INVENTION

In view of the foregoing disadvantages inherent in the known types of water cut off devices now present in the prior art, the present invention provides a new water flow monitoring device construction wherein the same can be utilized for precluding the flow of water within a building upon the detection of the water amounting to a predetermined amount.

The general purpose of the present invention, which will be described subsequently in greater detail, is to provide a new water flow monitoring device apparatus and method which has many of the advantages of the water cut off valves mentioned heretofore and many novel features that result in a new water flow monitoring device which is not anticipated, rendered obvious, suggested, or even implied by any of the prior art water cut off valves, either alone or in any combination thereof.

To attain this, the present invention generally comprises a water inlet pipe for receiving an unlimited amount of water. Also included is a water outlet pipe for supplying various water appliances within a building with water. As shown in the Figures a water valve is connected between the water inlet pipe and the water outlet pipe. During use, the water valve is adapted to preclude the flow of water between the pipes upon the deactivation thereof and further allow the flow of water therebetween upon the actuation thereof. A water flow monitor device is connected between the water inlet pipe and the water outlet pipe. During operation, the water flow monitor device is adapted to measure the current flow rate of water through the water pipes. Further, the device begins an associated timer upon the beginning of water flow after each cessation of such water flow. The timer continues to track time only as long as water flow continues. The water flow monitor device further is adapted to continuously calculate from the measured flow rate of water and time a total volume of water used. Upon the total volume of water used exceeding a predetermined amount, the water valve is deactivated. Also provided is a push button mounted on the water flow monitor device for actuating the water valve upon the depression thereof. As shown in FIG. 1, a power source includes a battery for supplying power to the water flow monitor device. A solar panel is connected to the battery for effecting the recharging thereof upon being exposed to light.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water flow monitoring device apparatus and method which has many of the advantages of the water cut off valves mentioned heretofore and many novel features that result in a new water flow monitoring device which is not anticipated, rendered obvious, suggested, or even implied by any of the prior art water cut off valves, either alone or in any combination thereof.

It is another object of the present invention to provide a new water flow monitoring device which may be easily and efficiently manufactured and marketed.

It is a further object of the present invention to provide a new water flow monitoring device which is of a durable and reliable construction .

An even further object of the present invention is to provide a new water flow monitoring device which is susceptible of a low cost of manufacture with regard to both materials and labor, and which accordingly is then susceptible of low prices of sale to the consuming public, thereby making such water flow monitoring device economically available to the buying public.

Still yet another object of the present invention is to provide a new water flow monitoring device which provides in the apparatuses and methods of the prior art some of the advantages thereof, while simultaneously overcoming some of the disadvantages normally associated therewith.

Still another object of the present invention is to provide a new water flow monitoring device for precluding the flow of water within a building upon the detection of the water amounting to a predetermined amount.

Even still another object of the present invention is to provide a new water flow monitoring device that includes a water inlet pipe for receiving an unlimited amount of water. Also included is a water outlet pipe for supplying various water appliances within a building with water. A water valve is connected between the water inlet pipe and the water outlet pipe. The water valve is adapted to preclude the flow of water therebetween upon being closed. Next provided is a water flow monitor device connected between the water inlet pipe and the water outlet pipe. The water flow monitor device serves to monitor the current flow rate of water through the water pipes and further begin a timer upon the beginning of water flow after each cessation of such water flow, wherein the timer continues to track time only as long as water flow continues. The water flow monitor device is further adapted to close the water valve upon certain criteria being met.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
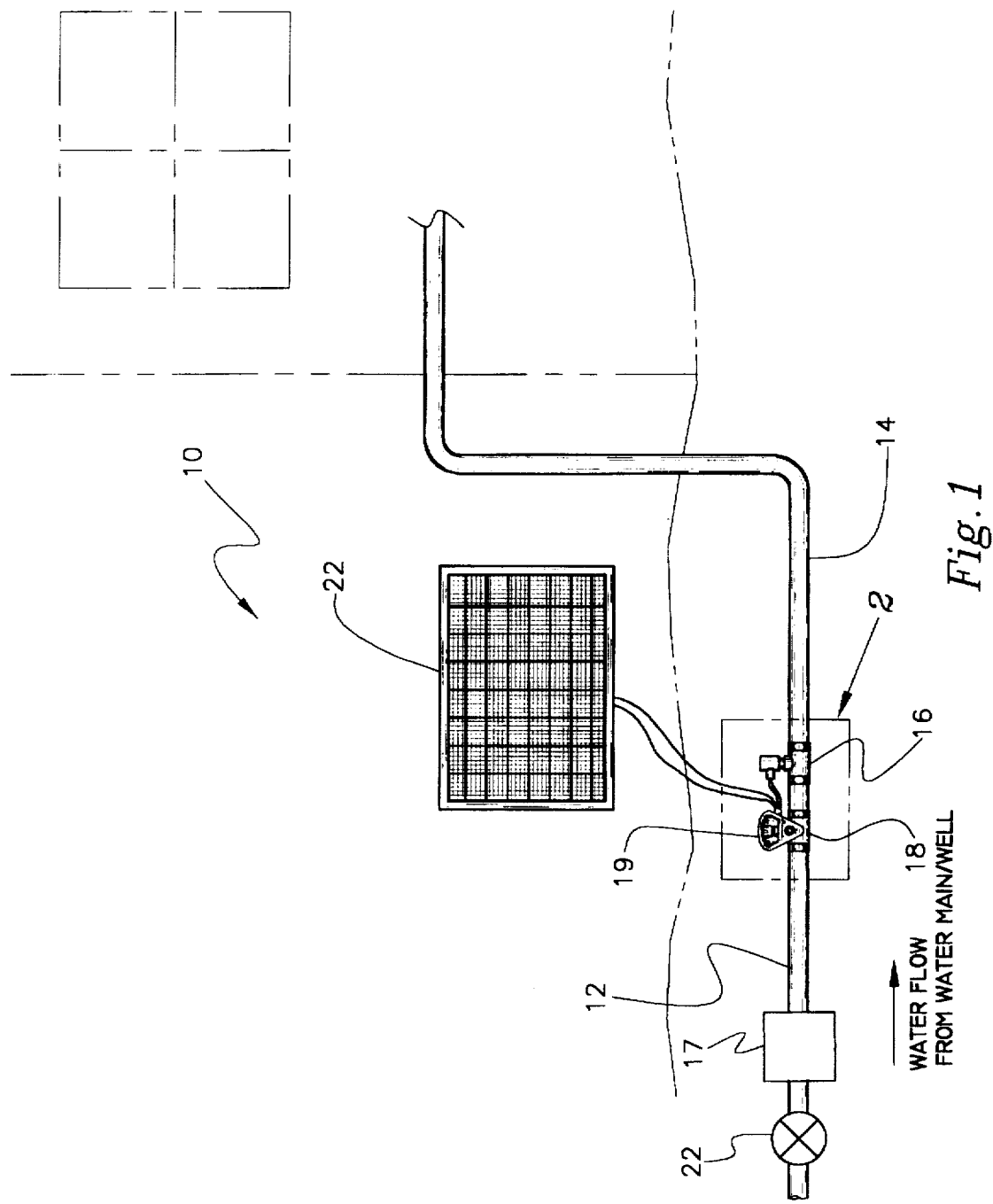
FIG. 1 is a front view of a new water flow monitoring device according to the present invention.
Figure 2:
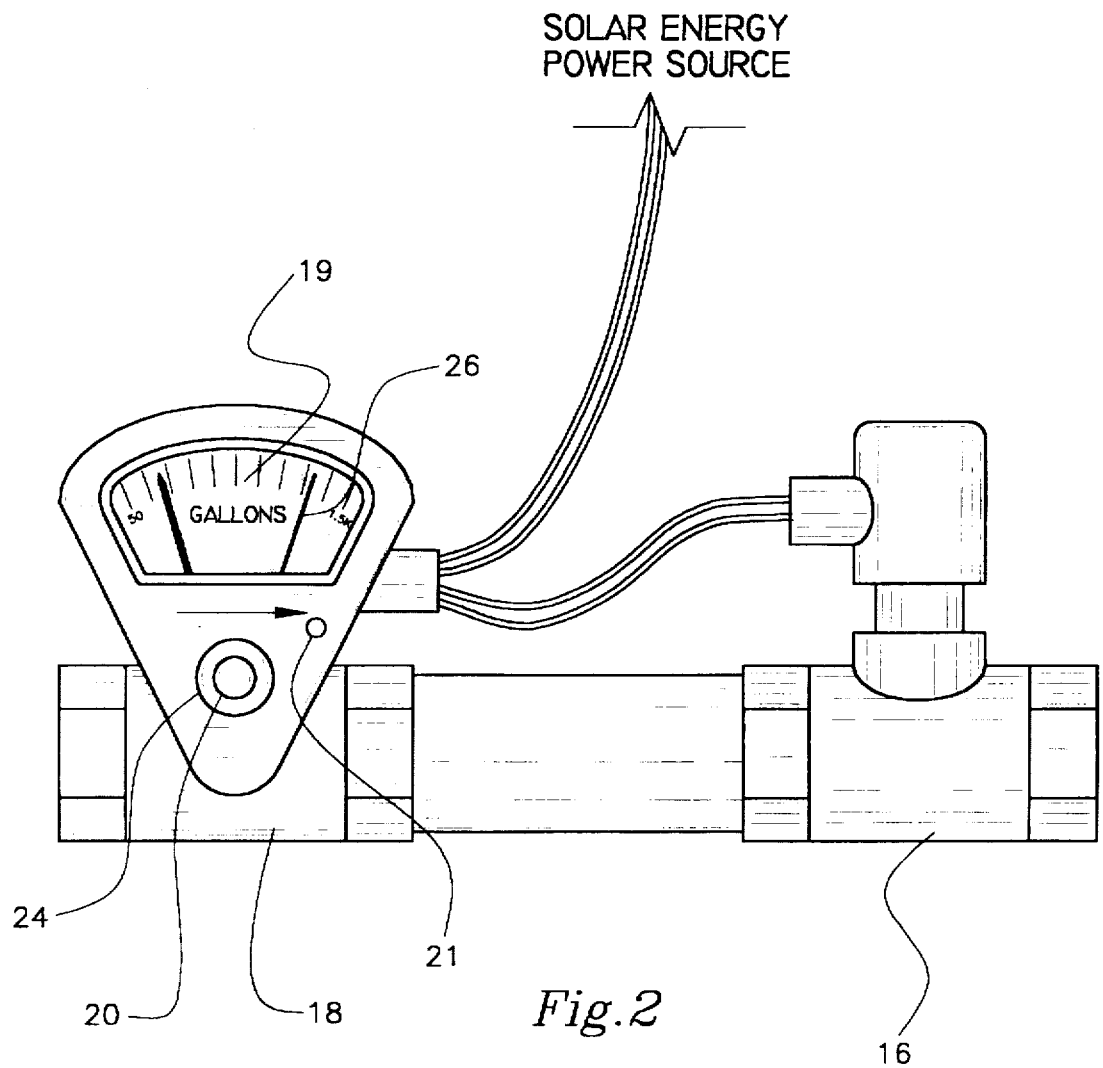
FIG. 2 is a close up view of the water valve and water flow monitor device of the present invention.

With reference now to the drawings, and in particular to FIGS. 1 through 2 thereof, a new water flow monitoring device embodying the principles and concepts of the present invention and generally designated by the reference numeral 10 will be described.

The present invention, as designated as numeral 10, includes a water inlet pipe 12 for receiving an unlimited amount of water. Also included is a water outlet pipe 14 for supplying various water appliances within a building with water.

As shown in the Figures, a water valve 16 is connected between the water inlet pipe and the water outlet pipe. During use, the water valve is adapted to preclude the flow of water between the pipes upon the deactivation thereof and further allow the flow of water therebetween upon the actuation thereof. In other words, the water valve is a normally closed valve when in an unbiased orientation.

A water flow monitor device 18 is connected between the water inlet pipe and the water outlet pipe. It should be noted that both the water flow monitor device and water valve are both mounted to the water pipe downstream of a conventional flow meter (or gauge) 17 and a manual valve 22. During operation, the water flow monitor device is adapted to measure the current flow rate of water through the water pipes. Further, the device begins an associated timer upon the beginning of water flow after each cessation of such water flow. The timer continues to track time only as long as water flow continues.

The water flow monitor device further is adapted to continuously calculate from the measured flow rate of water and time a total volume of water used. It should be noted that in alternate embodiments, a timer need not be used to calculate the total volume. Upon the total volume of water used exceeding a predetermined amount, the water valve is deactivated, or closed. In other words, every time water stops and starts again the timer begins incrementing and continues until water flow completely ceases. Accordingly, the calculated amount of total water supplied the appliances increases, at varying rates, until a predetermined amount is reached and the water valve is employed to cease further flow. By this operation, the present invention is capable of detecting leaks and preventing damage to the building.

In the alternative, the water flow monitor device is adapted to deactivate, or close, the water valve unconditionally after a predetermined amount of time. Further, as an option, an analog gauge 19 is included for indicating the calculated amount of total water supplied the appliances after a previous cessation of water flow. It should be noted that the analog gauge may also be used to selectively determine the aforementioned total volume of water used which must be exceeded before the valve is closed. Preferably, an adjustment knob 24 is provided on the gauge 19 for setting a limit indicating needle 26 for selecting the total volume. Such amount may be selected within a range of 25 to 1500 gallons.

Also provided is a reset push button 20 mounted on the water flow monitor device for actuating the water valve upon the depression thereof. It should be noted that the push button must be depressed every time the valve is deactivated, or closed, to resume normal operation.

As yet another option, an override momentary switch 21 is included. Upon the depression of the override momentary switch, the timer is not begun until after water flow begins and the first cessation of water flow occurs. This feature is for accommodating anticipated periods of high water volume use. In other words, when the present switch is depressed, the current state of the flow of water will not trigger the water flow monitor device as set forth hereinabove until after the water starts and stops one time.

As shown in FIG. 1, a power source includes a battery (not shown) for supplying power to the water flow monitor device. A solar panel 22 is connected to the battery for effecting the recharging thereof upon being exposed to light. By this structure, the present invention is always functional despite power losses.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A water leak detection valve system comprising, in combination:

- a water inlet pipe for receiving an unlimited amount of water;
- a water outlet pipe for supplying various water appliances within a building with water;
- a normally enclosed water valve connected between the water inlet pipe and the water outlet pipe, the water valve adapted to preclude the flow of water therebetween upon the deactivation thereof and further allow the flow of water therebetween upon the actuation thereof;
- a manual valve connected between the water inlet pipe and the water outlet pipe for manually precluding the flow of water therebetween;
- a first gauge connected between the water inlet pipe and the water outlet pipe for monitoring a total flow of water therebetwen;
- a water flow monitor device connected between the water inlet pipe and the water outlet pipe downstream of the manual valve and the first gauge, the water flow monitor device adapted to measure the current flow rate of water through the water pipes and further begin a timer upon the beginning of water flow after each cessation of such water flow, wherein the timer continues to track time only as long as water flow continues, the water flow monitor device further adapted to continuously calculate from the measured flow rate of water and time a total volume of water used, whereby upon the total volume of water used exceeding a predetermined amount of water, the water valve is deactivated;
- a second gauge connected between the water inlet pipe and the water outlet pipe for displaying an amount of water that has flowed therebetween only after a previous cessation of water flow and the timer is begun, wherein the second gauge has a selector function for allowing the selective determination of said predetermined amount of water within a range of 25 to 1500 gallons;
- a first push button mounted on the water flow monitor device for actuating the water valve upon the depression thereof, wherein the first push button must be depressed after each deactivation of the water flow monitor device in order to resume the flow of water;
- a second push button mounted on the water flow monitor device for precluding the start of the timer until after water flow begins and a first cessation of water flow occurs upon the depression thereof, thereby temporarily disabling the water flow monitor device; and
- a power source including a battery for supplying power to the water flow monitor device, the power source further including a solar panel connected to the battery for effecting the recharging thereof upon being exposed to light.

2. A water leak detection valve system comprising, in combination:

- a water inlet pipe for receiving an unlimited amount of water;
- a water outlet pipe for supplying various water appliances within a building with water;
- a water flow monitor device connected between the water inlet pipe and the water outlet pipe, the water flow monitor device, while operating, adapted to calculate a total volume of water used upon the beginning of water flow after each cessation of such water flow, whereby upon the total volume of water used exceeding a predetermined amount of water, the water valve is deactivated;
- a gauge connected between the water inlet pipe and the water outlet pipe for displaying an amount of water that has flowed therebetween only after a previous cessation of such water flow, wherein the gauge has a selector function for allowing the selective determination of said predetermined amount of water within a range of 25 to 1500 gallons;
- a first push button mounted on the water flow monitor device for actuating the water valve upon the depression thereof, wherein the first push button must be depressed after each deactivation of the water flow monitor device in order to resume the flow of water;
- a second push button mounted on the water flow monitor device for precluding the operation of the water flow monitor device until after water flow begins and a first cessation of water flow occurs upon the depression thereof, thereby temporarily disabling the water flow monitor device; and
- a power source including a battery for supplying power to the water flow monitor device, the power source further including a solar panel connected to the battery for effecting the recharging thereof upon being exposed to light.

* * * * *